Feb. 21, 1933.  F. L. JOHNSON  1,898,667
COLLAPSIBLE FORM FOR TIRE BUILDING
Filed Sept. 10, 1930  4 Sheets-Sheet 2

INVENTOR
FRANK L. JOHNSON
BY
ATTORNEYS

Feb. 21, 1933.  F. L. JOHNSON  1,898,667
COLLAPSIBLE FORM FOR TIRE BUILDING
Filed Sept. 10, 1930  4 Sheets-Sheet 3

INVENTOR
FRANK L. JOHNSON

BY

ATTORNEYS

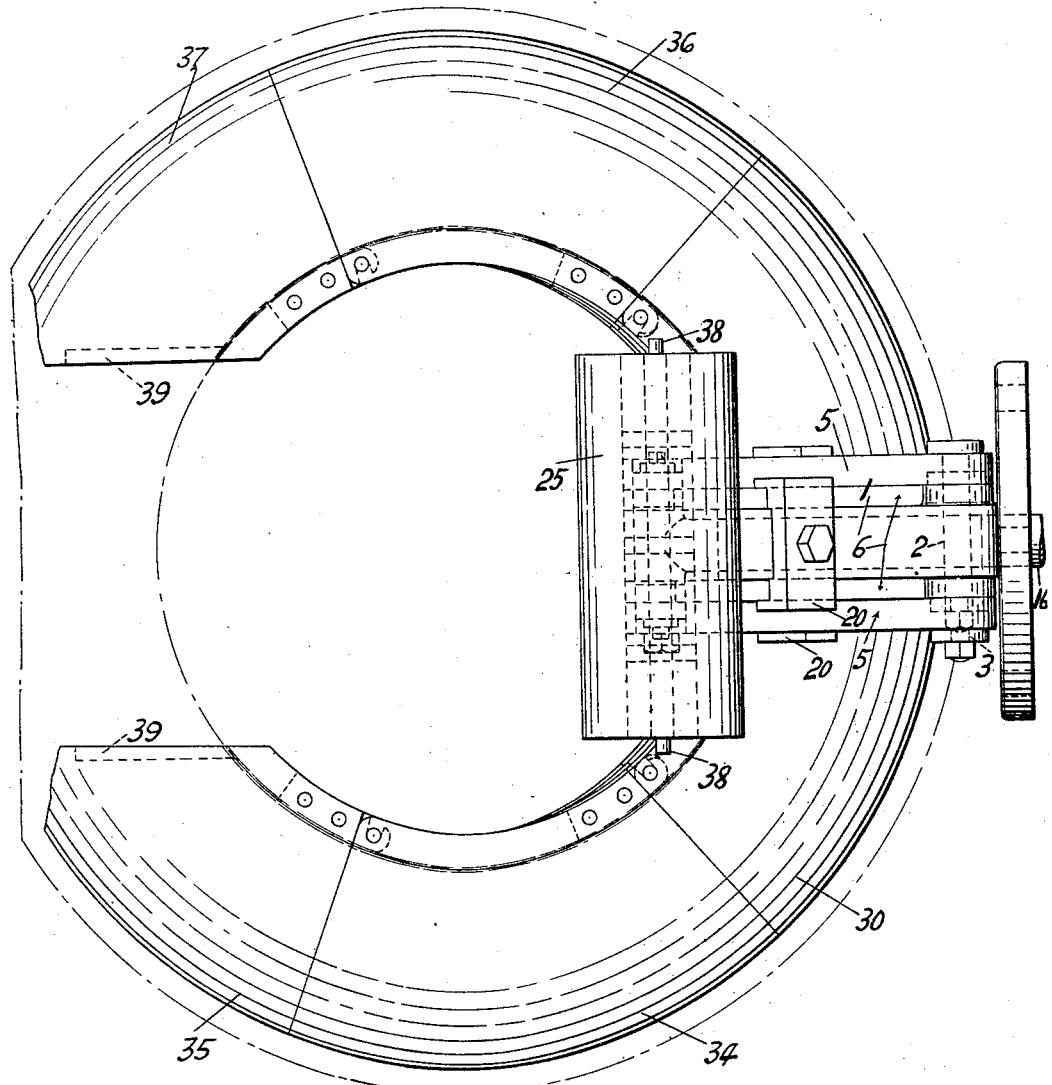

Patented Feb. 21, 1933

1,898,667

UNITED STATES PATENT OFFICE

FRANK L. JOHNSON, OF AKRON, OHIO

COLLAPSIBLE FORM FOR TIRE BUILDING

Application filed September 10, 1930. Serial No. 480,956.

The present invention relates to the art of tire building and particularly to the construction of tire building forms or cores, it being the object of the invention to construct a new and novel mechanism by which large or extremely bulky cores may be collapsed efficiently and economically.

The purpose of the invention is to devise a collapsing mechanism which shall be particularly useful in the manufacture of tires in which cores of large cross-section and small internal or bead diameters are employed. The invention has for its object a combination of elements so constructed and coordinated that a tire with a very small bead diameter may be stripped from the core quickly and easily, thereby facilitating the economical building of large pneumatic tires.

The core of the present invention combines a group of sections and a key section in such manner that the key section is removed from the group of sections and the latter is pivoted so as to shift toward the core axis and to swing as a group into a plane at an angle of the original core plane, the group being then located in such position that it may be readily collapsed as the final step in the stripping operation.

The invention has the further advantage in that the core is so designed that it will be readily adapted for mechanical operation.

While the invention is specifically shown and described as a core, it will be appreciated that the inventive features thereof may be employed in drum building as well. Where the term "core" is used, it will be understood that any tire building form is intended to be included, and this applies to the specification and claims. It will also be understood that the invention is not necessarily limited to exact conformity with the details shown and described, as changes and improvements may be made within the scope of the invention as set forth and claimed herein.

In the drawings in which the preferred form of the invention is illustrated,

Figure 4 is a plan view of the parts in the position of Figure 3; and

Figure 1:
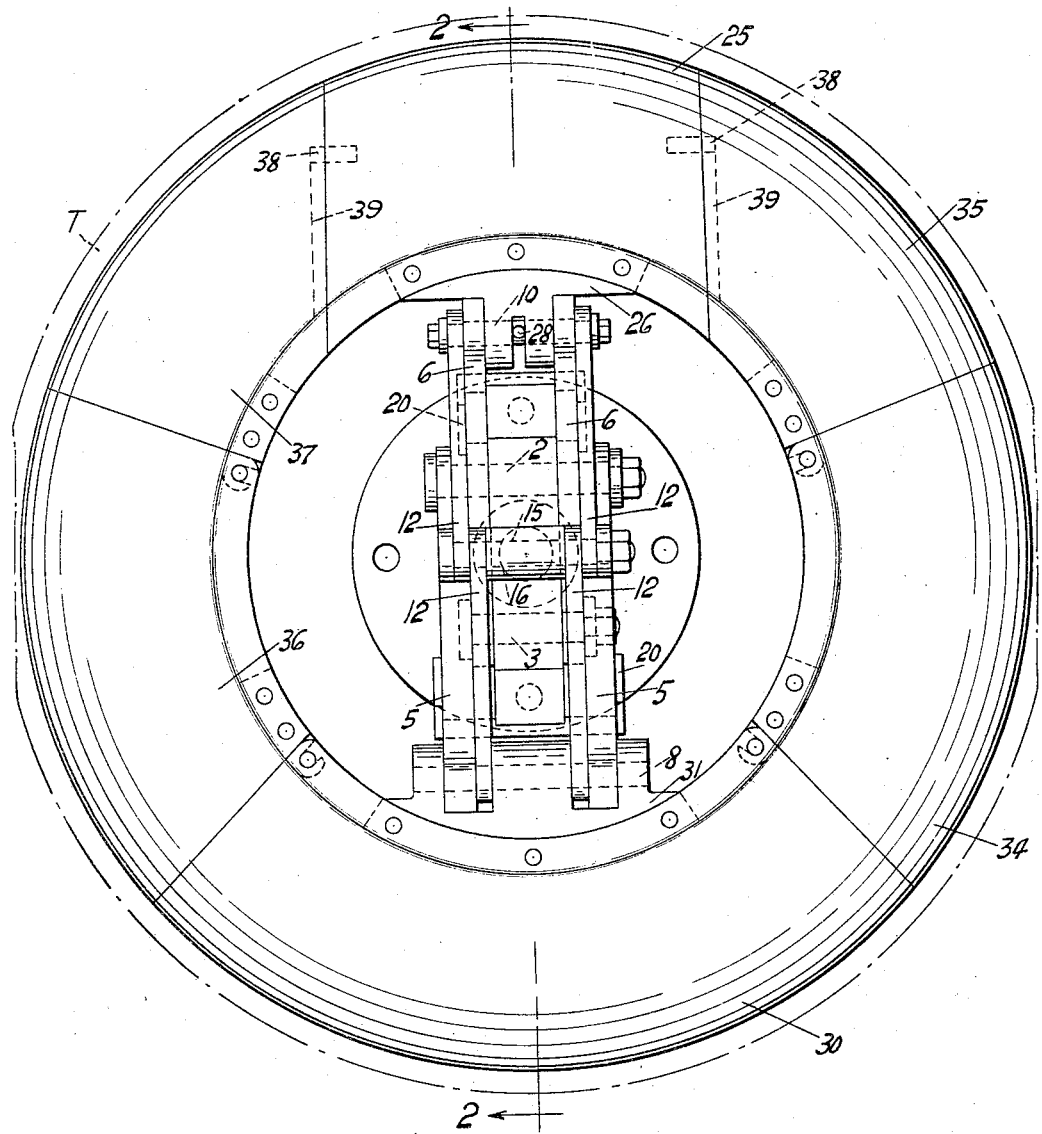
Figure 1 is a side elevation of a core constructed in accordance with the invention.

The core is provided with the central support 1 which is adapted to be secured upon the end of the shaft of the usual tire building core or stand. This support is in the form of a hub and above and below the axis of the core or support are the pivot pins 2 and 3 to the projecting ends of which are pivoted the two pairs of crossing lever arms 5 and 6, the former on the pin 2 and extending downwardly and the latter on the pin 3 and extending upwardly.

Through the outer ends of the arms 5 is the pin 8 which serves as the hinge pin upon which the group of core sections is mounted, as will be described. Through the outer ends of the levers 6 is the pin 10.

Extending from the pin 8 to the pin 10 is the double linkage 12, composed of upper and lower links mounted on the pins and connected at the center of the core by the knuckle pin 15. To the pin 15 is connected the operating rod 16 which extends rearwardly through the center of the hub 1, being adapted to be connected to any form of operating mechanism by which the rod can be advanced or retracted. Any suitable device may be employed for this purpose, such for example as a hydraulic cylinder or the like (not shown).

Figure 2:
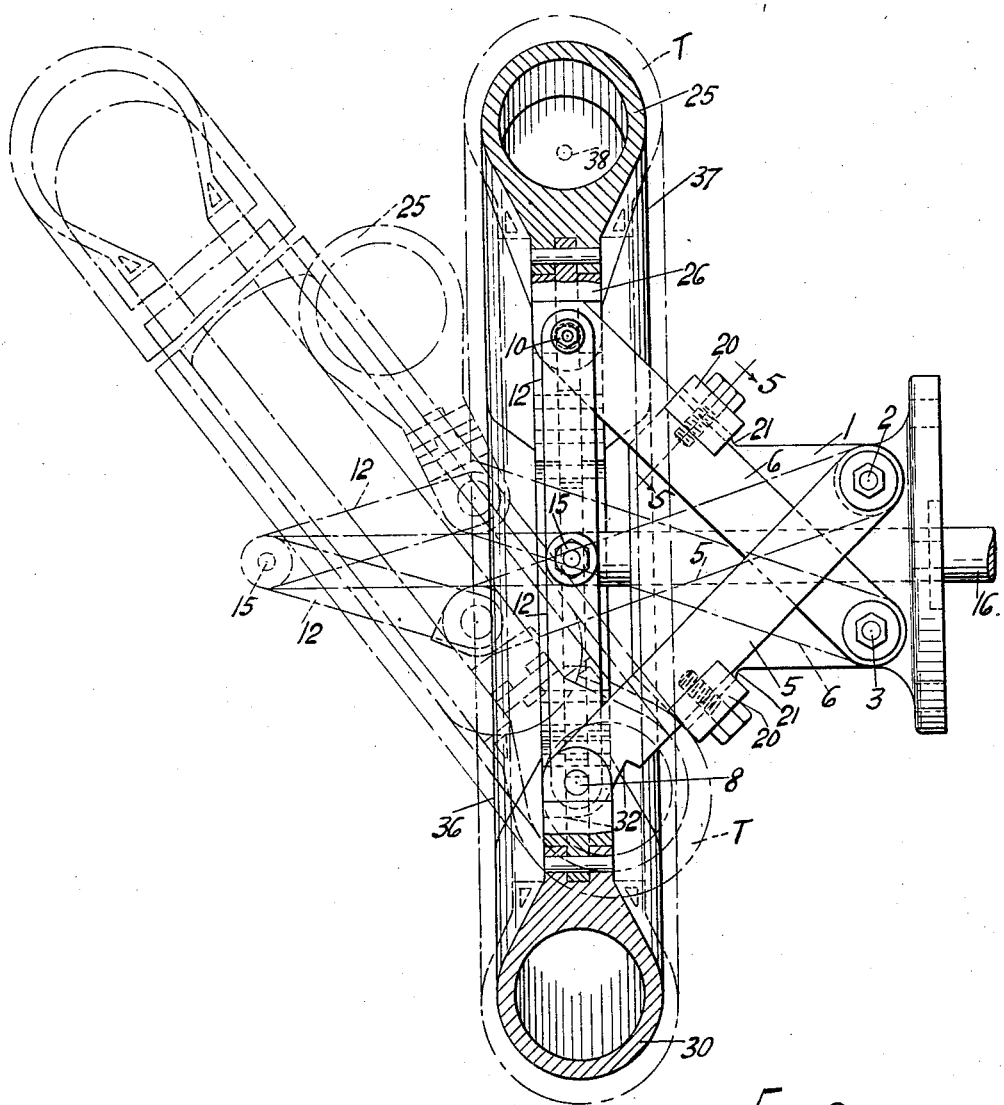
Figure 2 is a section on the line 2—2 of Figure 1, an intermediate position of the core during the collapsing thereof being shown in dotted lines.
Figure 5:
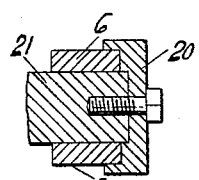
Figure 5 is a detail on the line 5—5 of Figure 2.

When the rod 16 is withdrawn to its rearmost position, as shown in Figure 2, the linkage 12 is substantially straight across the core in the central plane thereof, it being desirable for stability to move the linkage so that the knuckle 15 is slightly beyond center. To form stops for the mechanism, plates 20 are attached to pads 21 formed on the hub and are located in the paths of the arms 5 and 6. When the rod 16 is moved outwardly the outer ends of the arms 5 and 6 are brought together in substantially the position shown in dotted lines in Figure 2 which is the completion of the first stripping operation.

The core comprises a key section 25 which is carried upon a plate 26 attached to the tongue of the key section. The plate 26 is rigidly secured to the ends of the arms 6, preferably by welding it in place thereon so that the key section is at all times oblique with respect to these arms. As is shown in Figure 2 this construction will tilt the key section forwardly during the downwardly movement of the lever 6, a result which assists in the stripping of the key section from the tire. The pin 10 is rotatable in the plate 26 and may be provided with an eccentric at each end thereof where it enters the links 12 to permit adjustment for taking up wear of the parts, a hole 28 being located in the pin for rotation thereof.

Figure 3:
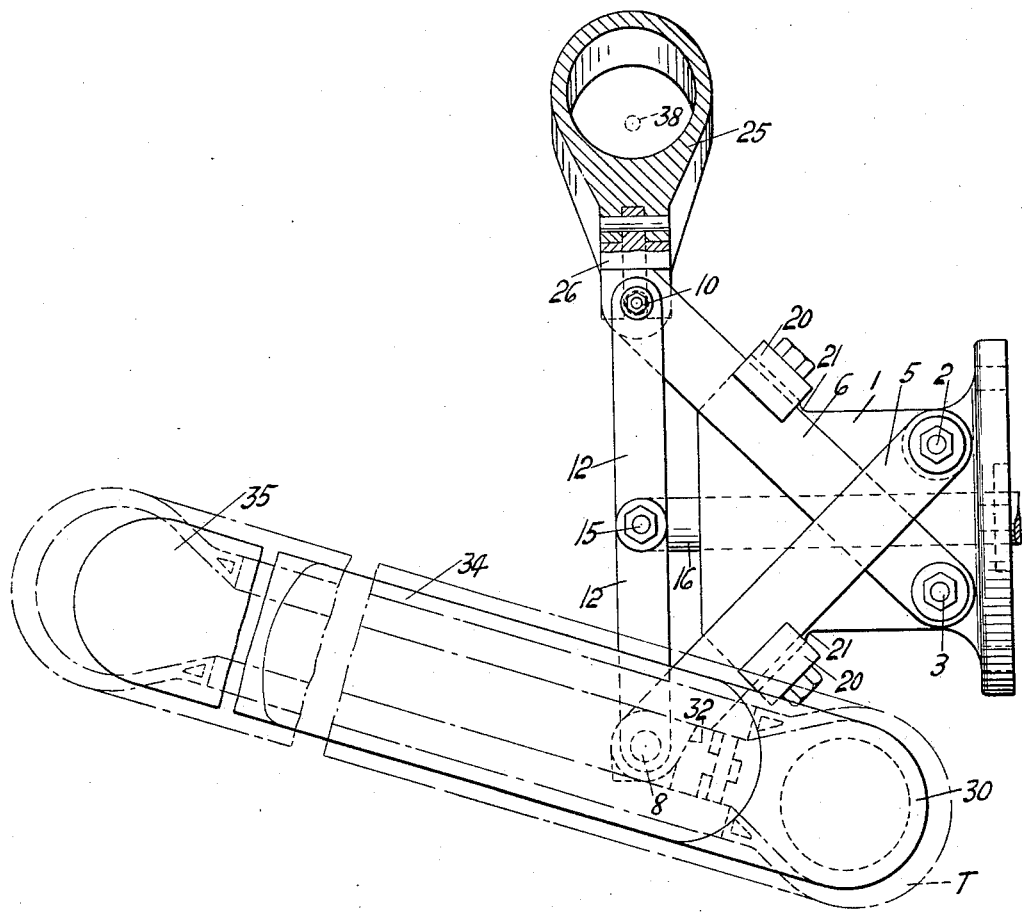
Figure 3 is a further view showing the core in its second position and ready for the final collapsing or stripping operation.

The group of sections comprises a central section 30, having secured to the tongue thereof a carrier plate 31 which is recessed to receive the ends of the arms 5 and the linkage 12, the pin 8 passing through the plate and the arms and links and forming a common pivot for these parts. The levers 5 may be cut out as at 32 to permit the rocking of the group of sections about the pin and to form a stop when the group is in its lowered position as shown in Figure 3.

To the ends of the central section 30 are attached the intermediate sections which with the sections 30 and 25 constitute the complete core. These sections may be in any number, and may be attached to the central section by hinges or any detachable connecting medium. As shown, the sections are numbered 34 and 35 on one end of the central section and 36 and 37 on the other. The connections are such that the intermediate sections may be pivoted or may be detached from the central section and from each other. Between the ends of the extreme intermediate sections and the key section are located the pin and slot connections 38 and 39 which hold the sections in alignment and also cause a partial joint movement of the key section and the group until the pins 38 pass out of the slot 39.

The operation of the apparatus may be briefly described as follows:—

Assuming that the core is in erected position, as shown in Figure 1 with a completed tire T therein, the rod 16 is moved forwardly, preferably by some mechanically operated mechanism. The linkage 12 is broken down and the knuckle joint 15 moves forwardly, moving the arms 5 and 6 toward parallelism. This action simultaneously moves the key section inwardly upon an arc about the center 3 and moves the central section and group of sections upon the pin 8 upwardly. As the two portions of the core move together, the group of sections will be rocked about the center 8, due to the connections 38 and 39, and the key section will be removed from the tire by the joint rocking movement and by the approach of the two portions of the core. After the key section is freed the group of sections is rocked about the pin 8 until the stop 32 limits that movement. The rod 16 is now withdrawn and the key section 25, removed from the tire, rises to its former position while the group of sections is lowered away from the key sections. There is now nothing within the circle of the tire and the group of sections can be collapsed and stripped from the tire in the manner dictated by their construction.

When the core is reassembled, the reverse set of movements is employed. It will be noted that the crossing links 5 and 6 are so arranged that there is never a dead center position and the collapsing mechanism will operate surely and effectively.

It will be seen that an extremely effective means has been devised by which the largest of tires can be stripped easily and effectively. The manner and arrangement of the two portions of the core, represented by the key section and the group of sections, can be varied and altered in the scope of the invention. It is believed that the principles of the invention are broadly new and the same are not limited to exact conformity with the detailed showing made here.

What is claimed is:—

1. A collapsible core divided into two portions, one of said portions comprising a key section, and means for moving the portions of the core toward the axis thereof and simultaneously stripping the key section from the tire, the remainder of the core comprising two pivots and being movable thereabout to a plane at an angle to the original core plane.

2. A collapsible core comprising a key section and a group of interconnected sections, a pivot for the group of sections about which the group may be rocked, and means for moving the key section and the pivotal mounting of the group of sections simultaneously toward the axis of the core.

3. A collapsible core comprising a key section, a pivot for the key section about which it may be moved toward and from the axis of the core, a group of interconnected sections, a carrier for the group movable toward and from the axis of the core, and a toggle mechanism for actuating the key section and the carrier.

4. A collapsible core comprising a key section, a pivot for the key section about which it may be moved toward and from the axis of the core, a group of interconnected sections, a carrier for the group movable toward and from the axis of the core, a common actuating mechanism for the key section and the carrier, and a pivotal connection between the group and the carrier for the group.

5. A collapsible core comprising a key section, a pivot for the key section about which it may be moved toward and from the axis of the core, a group of interconnected sections, a carrier for the group movable toward and from the axis of the core, a common actuating mechanism for the key section and the carrier, a pivotal connection between the group and the carrier for the group, and means to cause the pivotal movement of the group simultaneously with the movement of the key section.

6. In a collapsible core, a central support, a pair of arms pivoted upon the support, a key section carried by one of said arms, a group of sections carried by the other arm, and a pivotal connection between the group of sections and its arm.

7. In a collapsible core, a central support, a pair of arms pivoted upon the support, a key section rigidly attached to one of said arms, a group of sections carried by the other arm, and a pivotal connection between the group of sections and its arm.

8. In a collapsible core, a central support, an arm movable upon the support, a key section on the arm, a second arm movable on the support, a group of core sections supported by the second arm, and means connecting the free ends of said arms to cause concurrent movement thereof.

9. In a collapsible core, a central support, an arm movable upon the support, a key section on the arm, a second arm movable on the support, a group of core sections pivotally supported by the second arm, and means to cause joint movement of said arms.

10. In a collapsible core, a central support, an arm movable upon the support, a key section rigid with the arm, a second arm movable on the support, a group of core sections pivoted on the second arm, a sliding interlocking connection between the group of sections and the key section, and means to cause joint movement of said arms.

11. In a collapsible core, a central support, an arm pivoted upon the support, a key section rigid with the arm, a second arm pivoted on the support, a group of core sections pivoted on the second arm, a sliding interlocking connection between the group of sections and the key section, and means to cause joint movement of said arms.

12. A collapsible core comprising a key section and a group of sections connected together, means to move the key section toward and from the core axis, a shiftable pivot for the group of sections, and means to cause the joint movement of the key section and the shifting of the pivot.

13. A collapsible core comprising a key section and a group of sections connected together, means to move the key section toward and from the core axis, a shiftable pivot for the group of sections, means to cause the joint movement of the key section and the shifting of the pivot, and means to cause simultaneous movement of the key section toward the axis of the core, shifting of the pivot toward the axis of the core and rocking of the group about the pivot.

FRANK L. JOHNSON.